United States Patent
Ko

(10) Patent No.: US 8,582,216 B2
(45) Date of Patent: Nov. 12, 2013

(54) WIDE-ANGLE IMAGE LENS MODULE HAVING LONG FLANGE BACK DISTANCE

(75) Inventor: Chun-Cheng Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 41 days.

(21) Appl. No.: 13/477,090

(22) Filed: May 22, 2012

(65) Prior Publication Data

US 2013/0235475 A1 Sep. 12, 2013

(30) Foreign Application Priority Data

Mar. 6, 2012 (TW) .............................. 101107434 A

(51) Int. Cl.
*G02B 3/02* (2006.01)
*G02B 13/18* (2006.01)

(52) U.S. Cl.
USPC ............................. 359/716; 359/784; 359/785

(58) Field of Classification Search
USPC ......... 359/708–717, 748, 754–758, 763–766, 359/771–778, 784–785, 789, 793, 795
See application file for complete search history.

(56) References Cited

U.S. PATENT DOCUMENTS

| | | | |
|---|---|---|---|
| 8,000,033 B1 * | 8/2011 | Tang et al. | 359/716 |
| 8,164,840 B2 * | 4/2012 | Chen et al. | 359/784 |
| 8,184,385 B2 * | 5/2012 | Chen et al. | 359/716 |

\* cited by examiner

*Primary Examiner* — Thomas K Pham
*Assistant Examiner* — Sharrief Broome
(74) *Attorney, Agent, or Firm* — Altis & Wispro Law Group, Inc.

(57) ABSTRACT

An image lens module includes a first lens, a second lens, a third lens, and an image plane and satisfies: FB/TTL>0.16, G1R1/F1>1.04, and D1/D2<4.47. FB is a distance between an apex of an image-side surface of the third lens and the image plane. TTL is a distance between an object-side surface of the first lens and the image plane. G1R2 is a curvature radius of an image-side surface of the first lens. F1 is focal length of the first lens. D1 is a distance between the end of the effective diameter of an image-side surface of the second lens and an optical axis of the image lens module in a direction perpendicular to the optical axis. D2 is a distance between the end of the effective diameter of the image-side surface of the second lens and an apex of the image-side surface of the second lens along the optical axis.

7 Claims, 25 Drawing Sheets

WIDE-ANGLE IMAGE LENS MODULE HAVING LONG FLANGE BACK DISTANCE

BACKGROUND

1. Technical Field

The present disclosure relates to lenses and, particularly, to a wide-angle image lens module having a long flange back distance (FBD).

2. Description of Related Art

Lens modules with long FBD have the advantage of being adaptable to many camera systems and allow the use of other optical elements such as filters. On the other hand, wide-angle image lens modules allow more of a scene to be captured in a single image. However, present wide-angle lens modules do not come with long FBD.

Therefore, it is desirable to provide an image lens module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
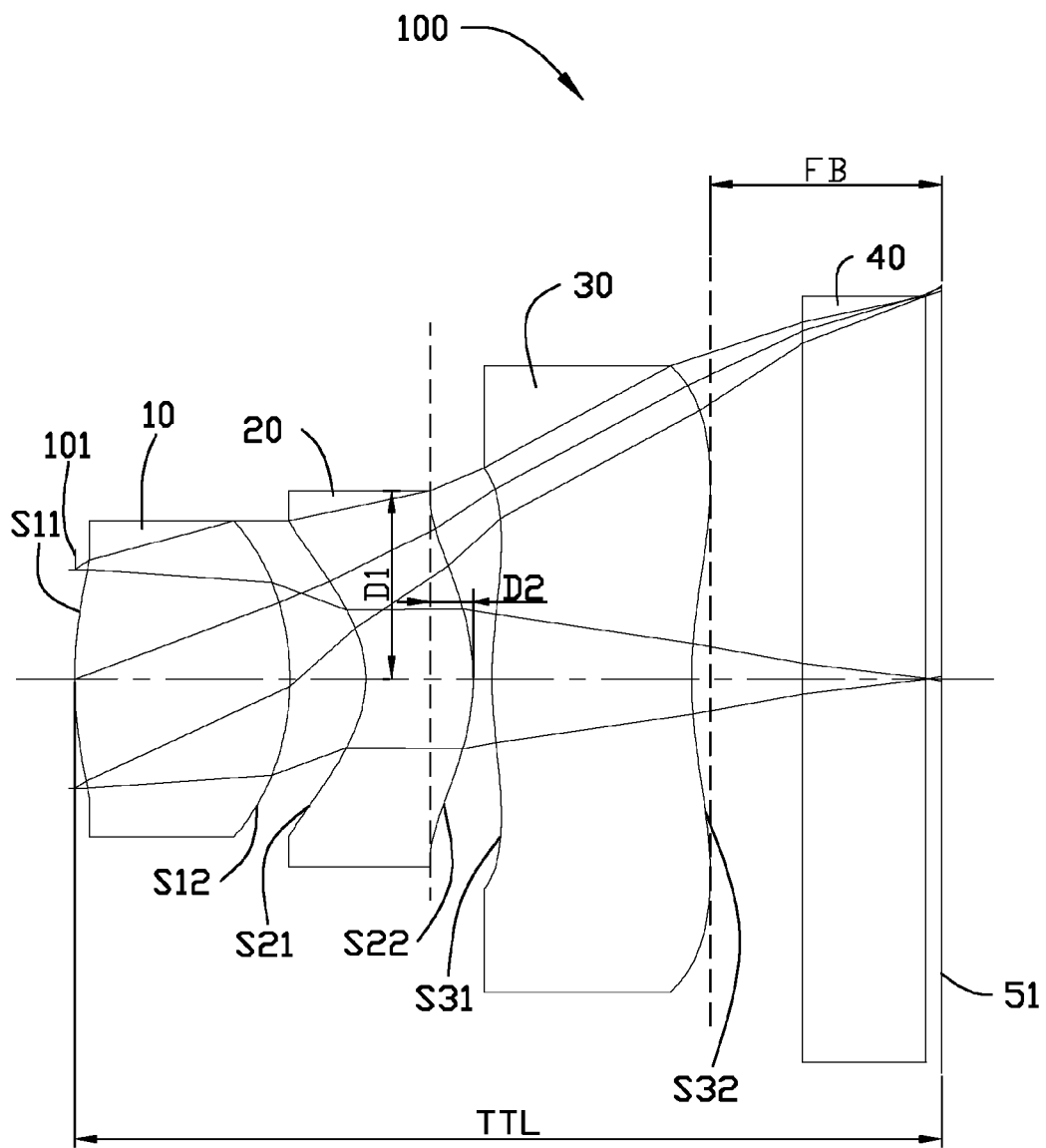
FIG. 1 is a schematic view of an image lens module in accordance with the present disclosure.

Referring to FIG. 1, an image lens module 100, according to a first exemplary embodiment, includes in order from the object side to the image side thereof, an aperture 101, a first lens 10 of positive refractive power, a second lens 20 of negative refractive power, a third lens 30 of positive refractive power, a filter 40, and an image plane 51. In this embodiment, the filter 40 is an infrared cut filter.

When capturing an image, incident light rays enter the image lens module 100 from the aperture 101, transmit through the three lenses 10, 20, 30, the filter 40, and reach the image plane 51.

The first lens 10 includes a first object-side surface S11 and a first image-side surface S12. The second lens 20 includes a second object-side surface S21 and a second image-side surface S22. The third lens 30 includes a third object-side surface S31 and a third image-side surface S32. The first object-side surface S11, the second object-side surface S21, and the third object-side surface S31 face the subject side of the image lens module 100. The first image-side surface S12, the second image-side surface S22, and the third image-side surface S32 face the image side of the image lens module 100. In this embodiment, the first lens 10, the second lens 20, and the third lens 30 are aspherical lenses. The surfaces S11, S12, S22, and S31 are convex surfaces, and the surfaces S21 and S32 are concave surfaces. The aperture 101 is positioned on the first object-side surface S11 of the first lens 10.

The image lens module 100 satisfies the following formulas:

$$FB/TTL > 0.16 \quad (1)$$

$$G1R1/F1 > 1.04 \quad (2)$$

$$D1/D2 < 4.47 \quad (3)$$

Wherein FB is a distance between an apex of the third image-side surface S32 and the image plane 51, TTL is a distance between the first object-side surface S11 and the image plane 51, G1R1 is the radius of curvature of the first object-side surface S11, F1 is the focal length of the first lens 10, D1 is a distance between the end of the effective diameter of the second image-side surface S22 and the optical axis of the second lens 20 along a direction perpendicular to the optical axis of the image lens module 100, D2 is a distance between the end of the effective diameter of the second image-side surface S22 and the apex of the second image-side surface S22 along the optical axis of the image lens module 100. The end of the effective diameter of the second image-side surface S22 is the end of the optical area of the second image-side surface S22, that is, the intersecting surface of the second image-side surface S22 and critical light rays passing through the second image-side surface S22.

The formula (1) is used for making the image lens module 100 have a long FBD, the formula (2) is used for making the image lens module 100 a wide angle lens module, the formula (3) is used for making the image lens module 100 have a better imaging quality at all focus settings.

To further improve the imaging quality of the image lens module 100, the second lens 20 satisfies the formula: (4) $0.58 > G2R2/F2 > G2R1/F2 > 0.10$, and the third lens 30 satisfies the formula (5) $0.23 > G3R2/F3 > G3R1/F3 > 0$.

Wherein G2R1 is the radius of curvature of the second object-side surface S21, G2R2 is the radius of curvature of the second image-side surface S22, G3R1 is the radius of curvature of the third object-side surface S31, G3R2 is the radius of curvature of the third image-side surface S32, F2 is the focal length of the second lens 20, and F3 is the focal length of the third lens 30.

The formula (4) is used for improving the imaging quality of the image lens module 100, the formula (5) is also used for increasing the FBD of the image lens module 100.

To prevent chromatic aberration of the image lens module 100, the image lens module 100 satisfies the formulas: (6) $Vd1 > 53$, (7) $Vd2 < 33$, (8) $Vd3 > 53$.

Wherein Vd1 is the Abbe number of d light (wavelength: 587.6 nm) of the first lens 10, Vd2 is the Abbe number of d light (wavelength: 587.6 nm) of the second lens 20, Vd3 is the Abbe number of d light (wavelength: 587.6 nm) of the third lens 30.

The first object-side surface S11, the first image-side surface S12, the second object-side surface S21, the second image-side surface S22, the third object-side surface S31, the third image-side surface S32 are aspherical surfaces, and are shaped according to the formula:

$$x = \frac{ch^2}{1 + \sqrt{1 - (k+1)c^2 h^2}} + \sum A_i h^i \qquad (9)$$

wherein h is a height from the optical axis of the image lens module 100 to a point on the aspherical surface, c is a vertex curvature, k is a conic constant, and Ai is i-th order correction coefficients of the aspheric surfaces.

In the exemplary embodiment, the following symbols are used:

F/No: F number;

2ω: field angle;

R: radius of curvature;

D: distance between surfaces on the optical axis of the image lens module 100;

Nd: refractive index of the lens of d light (wavelength: 587.6 nm); and

Vd: abbe number of d light (wavelength: 587.6 nm).

The image lens module 100 of the first embodiment satisfies the tables 1-3.

TABLE 1

| Surface | R (mm) | D (mm) | Nd | Vd |
|---|---|---|---|---|
| Aperture 101 | Infinity | −0.04 | — | — |
| First object-side surface S11 | 1.78 | 0.96 | 1.53 | 56.0 |
| First image-side surface S12 | −1.27 | 0.34 | — | — |
| Second object-side surface S21 | −0.52 | 0.48 | 1.64 | 23.9 |
| Second image-side surface S22 | −1.09 | 0.08 | — | — |
| Third object-side surface S31 | 1.74 | 0.89 | 1.53 | 56.0 |
| Third image-side surface S32 | 1.84 | 0.50 | — | — |
| Filter 40 | Infinity | 0.55 | 1.52 | 58.6 |
| Air | Infinity | 0.08 | — | — |
| Image plane 51 | — | — | — | — |

TABLE 2

| Surface | Aspherical coefficient |
|---|---|
| First object-side surface S11 | K = −28.6437; A4 = 0.3912; A6 = −0.8784; A8 = −0.2157; A10 = −2.2023; A12 = 20.3190; A14 = −29.6649; A16 = 0 |
| First image-side surface S12 | K = −4.9480; A4 = −0.3915; A6 = −0.0306; A8 = −0.0846; A10 = 1.7780; A12 = −3.7980; A14 = 2.4717; A16 = 0 |
| Second object-side surface S21 | K = −2.4229; A4 = −0.5455; A6 = 1.6233; A8 = 1.4015; A10 = −1.7847; A12 = 6.6963; A14 = −5.1675; A16 = 0 |
| Second image-side surface S22 | K = −4.1006; A4 = −0.4162; A6 = 1.4608; A8 = −1.4487; A10 = 0.6747; A12 = −0.4618; A14 = 0.4676; A16 = 0 |
| Third object-side surface S31 | K = −17.0393; A4 = −0.4251; A6 = 0.6075; A8 = −0.4870; A10 = −0.1788; A12 = 0.5530; A14 = −0.3326; A16 = 0 |
| Third image-side surface S32 | K = −0.2557; A4 = −0.3396; A6 = 0.1959; A8 = −0.0657; A10 = −0.0110; A12 = 0.0125; A14 = −2.6E−03; A16 = 0 |

TABLE 3

| F(mm) | F/NO | 2ω | FB(mm) | TTL(mm) | D1(mm) | D2(mm) |
|---|---|---|---|---|---|---|
| 2.73 | 2.79 | 64.86° | 1.04 | 3.88 | 0.840 | 0.192 |

In the first exemplary embodiment, F1=1.55 mm, F2=−2.31 mm, F3=14.60 mm, FB/TTL=0.27, G1R1/F1=1.15, D1/D2=4.375, G2R2/F2=0.47, G2R1/F2=0.23, G3R2/F3=0.13, G3R1/F3=0.12, Vd1=56, Vd2=23.9, Vd3=56.

Figure 2:
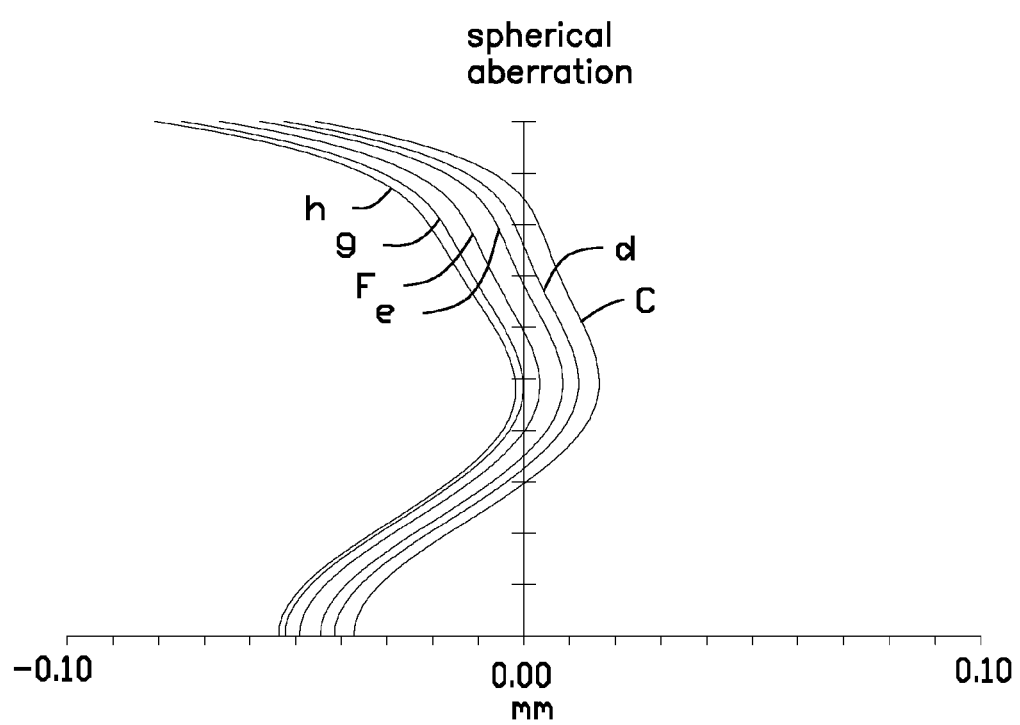
FIGS. 2, 4, 6, 8, 10, and 12 respectively show spherical aberration, field curvature, distortion, chromatic aberration, characteristic curves of modulation transfer function (MTF), and chief ray angle occurring in the image lens module when the focus is set to infinity, according to a first exemplary embodiment.
Figure 3:
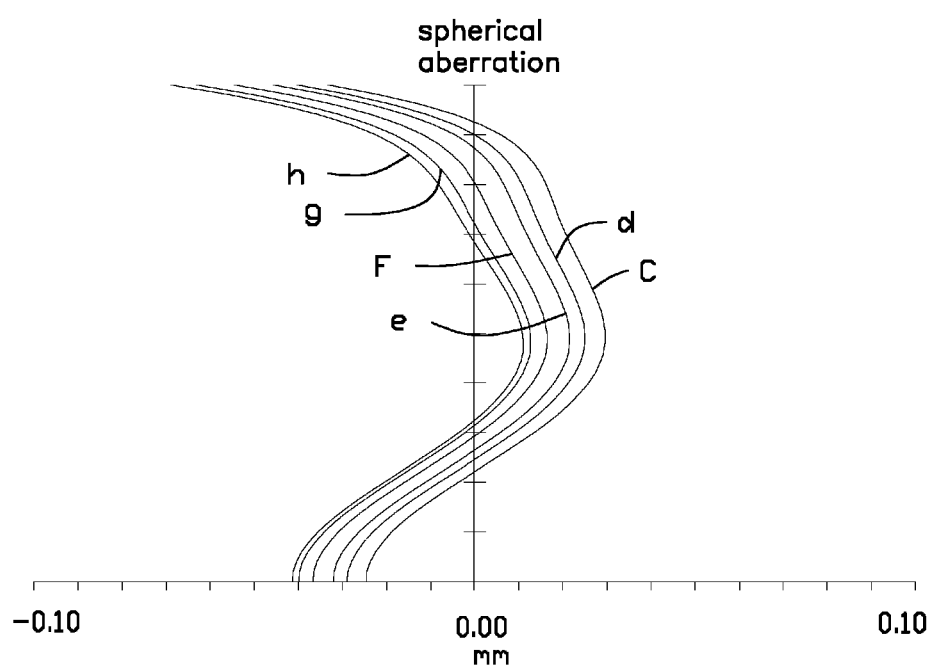
FIGS. 3, 5, 7, 9, 11, and 13 respectively show spherical aberration, field curvature, distortion, chromatic aberration, characteristic curves of modulation transfer function (MTF), and chief ray angle occurring in the image lens module, when the focus is set on the most close-up setting, according to the first exemplary embodiment.

Referring to FIG. 2-3, the curves h, g, F, e, d and C are respective spherical aberration characteristic curves of h light (wavelength: 404.7 nm), g light (wavelength: 435.8 nm), F light (wavelength: 486.1 nm), e light (wavelength: 546.1 nm), d light (wavelength: 587.6 nm), C light (wavelength: 656.3 nm) occurring in the first exemplary embodiment. Obviously, spherical aberration of visible light (400-700 nm) occurring at both extremes of focus of the image lens module 100 of the first exemplary embodiment is in a range of: −0.09 mm~0.09 mm.

Figure 4:
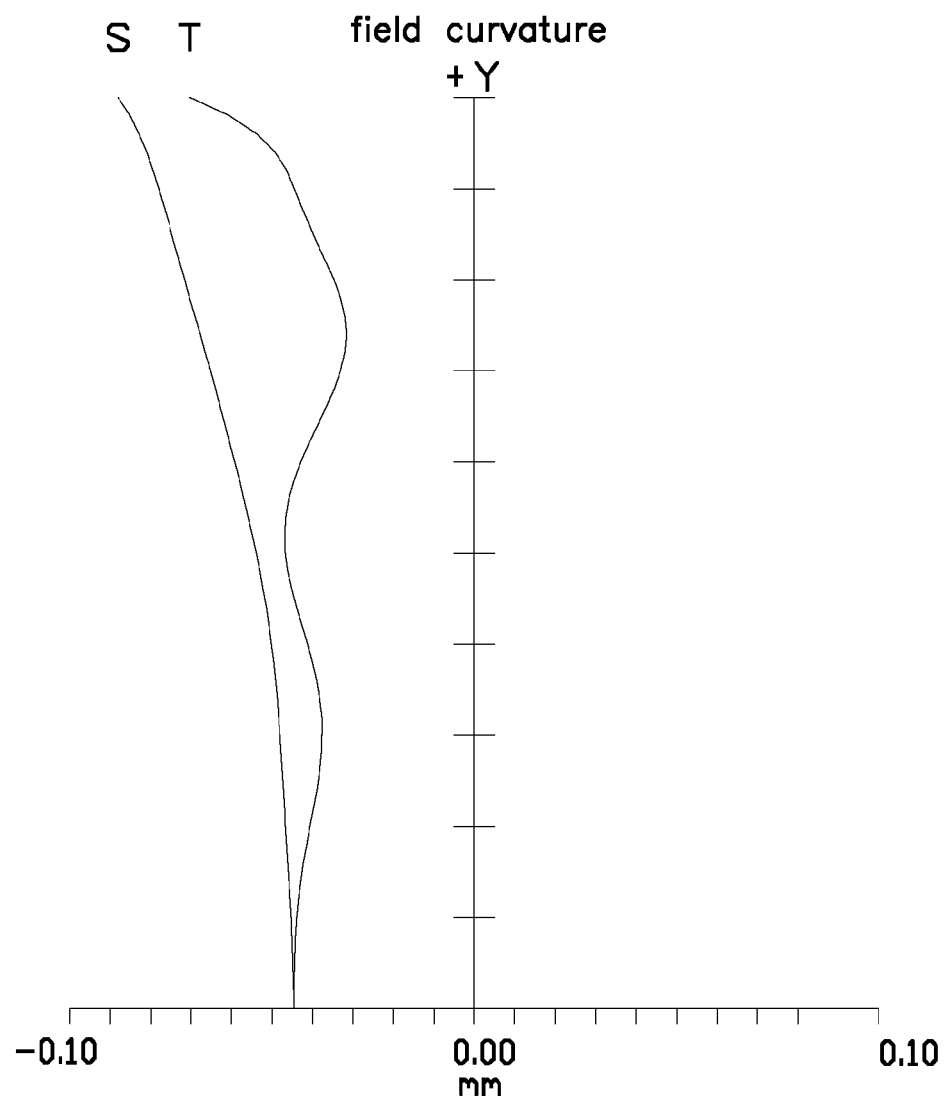
Figure 5:
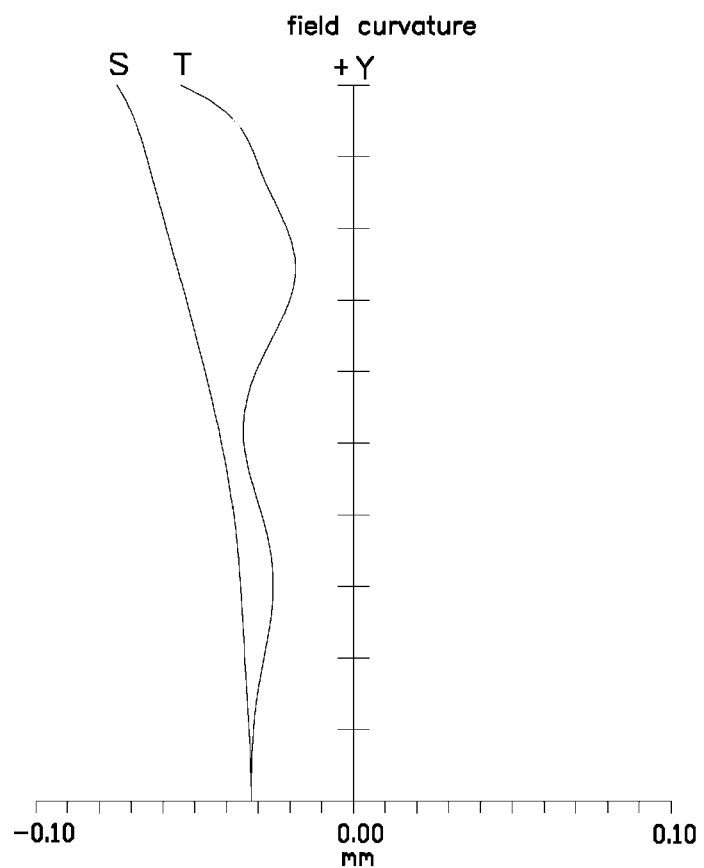

Referring to FIG. 4-5, the curves T and S are the tangential field curvature curve and the sagittal field curvature curve, respectively. Clearly, field curvature occurring at both extremes of focus of the image lens module 100 of the first exemplary embodiment is limited to a range of: −0.1 mm~0 mm.

Figure 6:
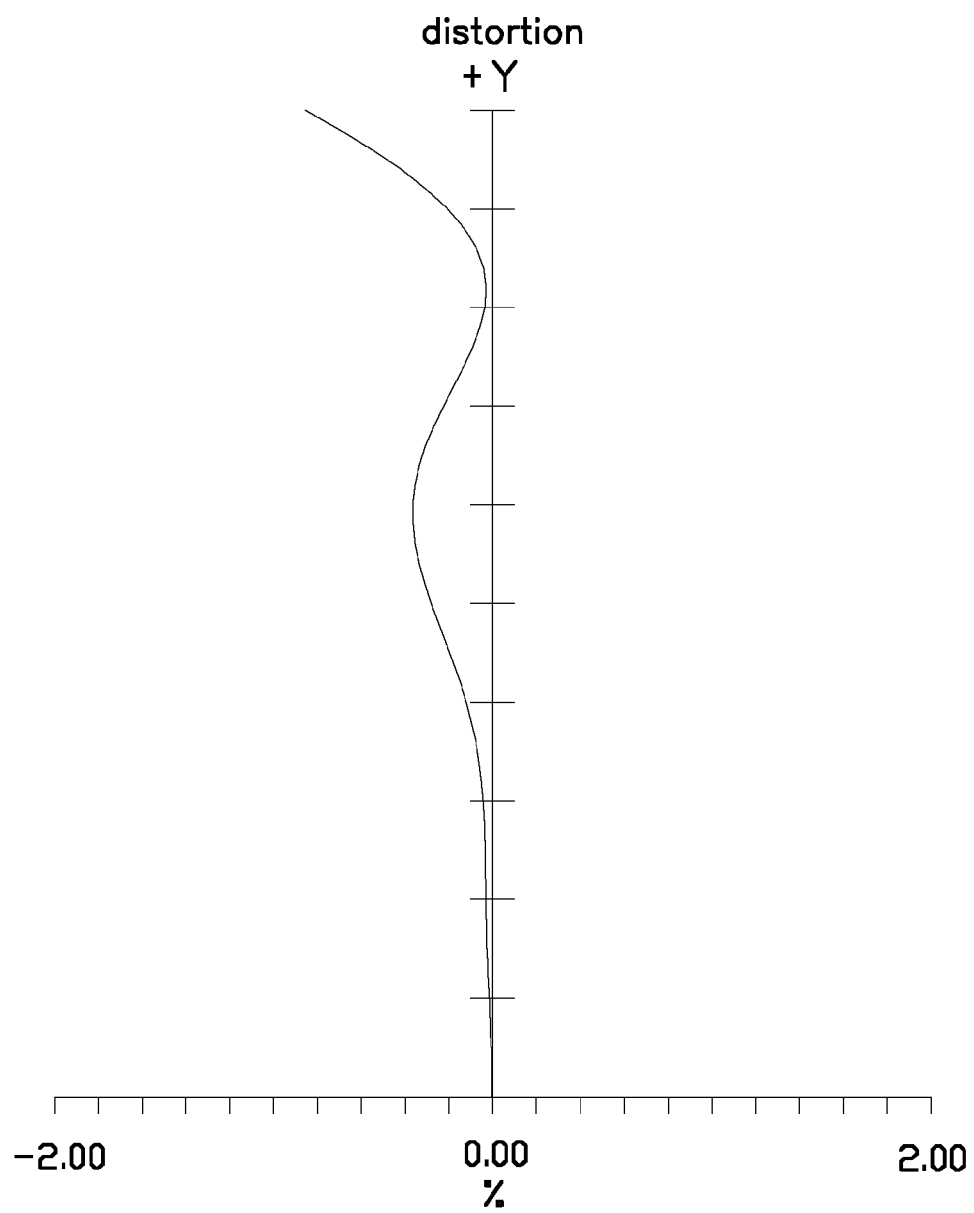
Figure 7:
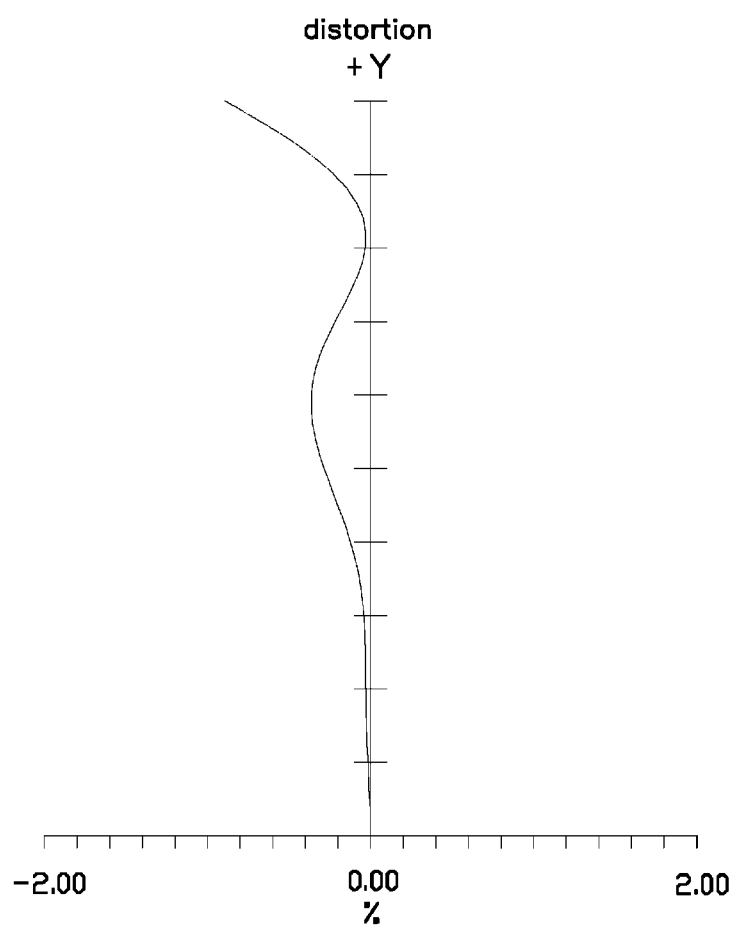

Referring to FIG. 6-7, distortion occurring at both extremes of focus of the image lens module 100 of the first embodiment is limited within the range of: −2%~0.

Figure 8:
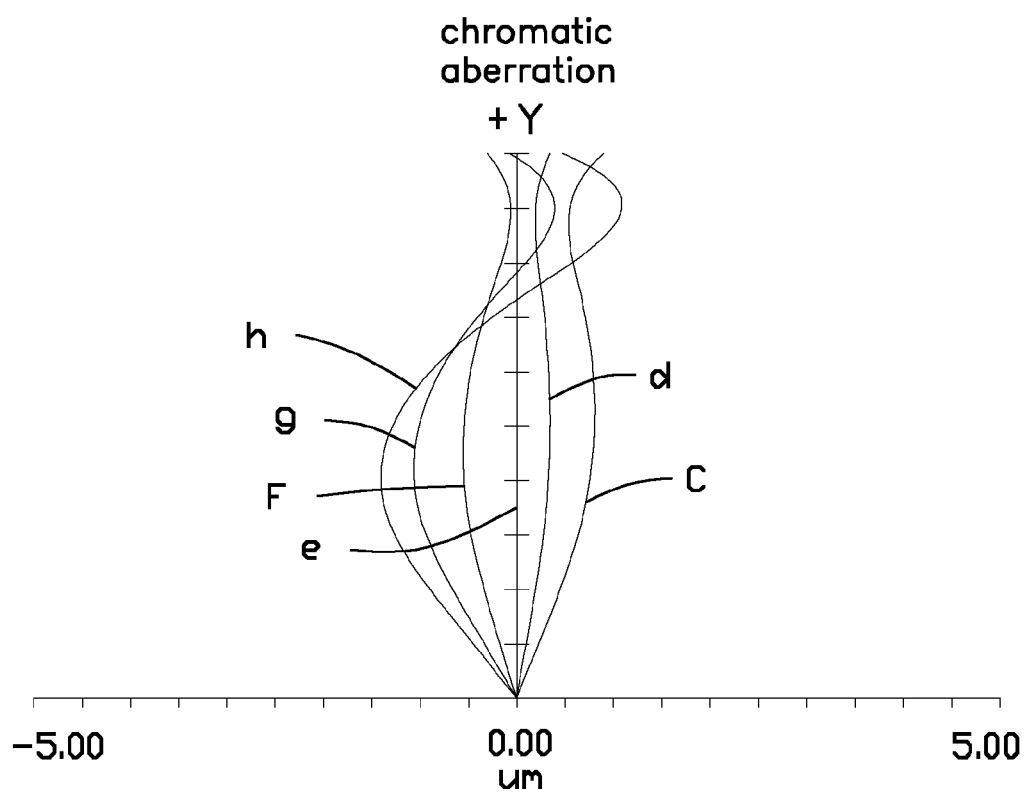
Figure 9:
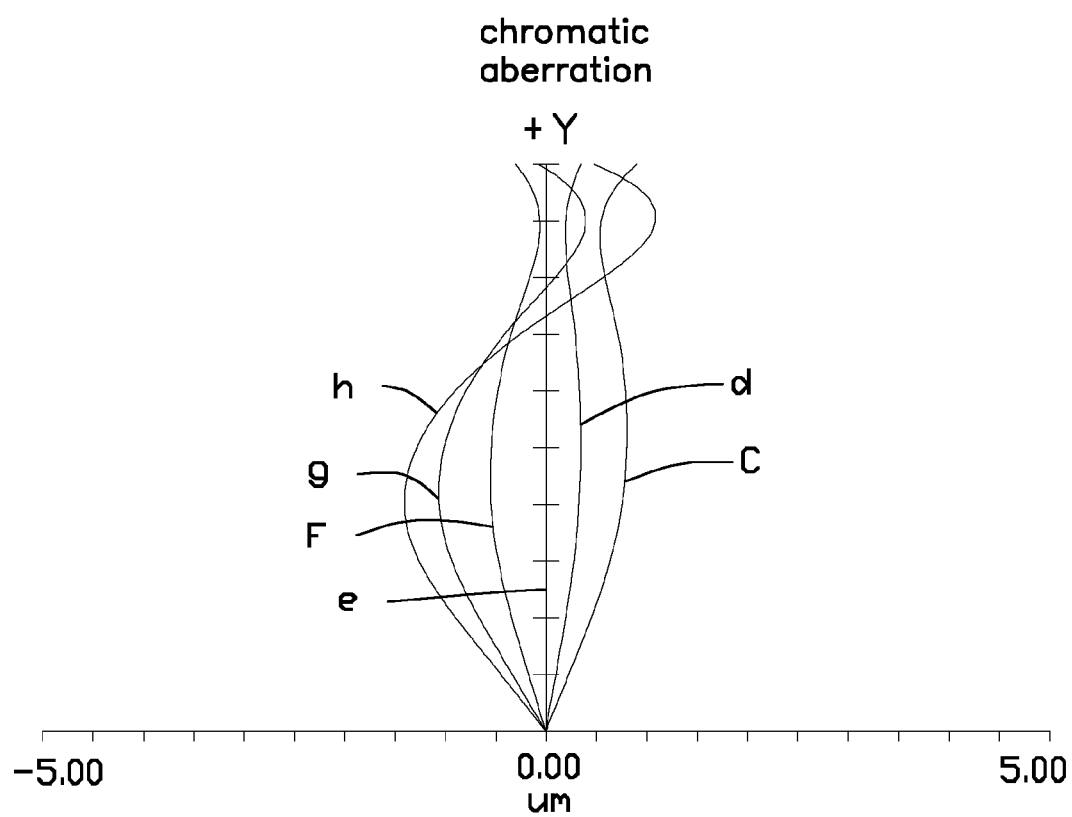

Referring to FIG. 8-9, the curves h, g, F, e, d and C are respective chromatic aberration curves of h light (wavelength: 404.7 nm), g light (wavelength: 435.8 nm), F light (wavelength: 486.1 nm), e light (wavelength: 546.1 nm), d light (wavelength: 587.6 nm), C light (wavelength: 656.3 nm) occurring in the first embodiment. Obviously, chromatic aberration curves of visible light (400-700 nm) occurring at both extremes of focus of the image lens module 100 of the first exemplary embodiment is less than two times of side length of the pixel size. In this first embodiment, the side length of the pixel size is 1.75 μm.

Figure 10:
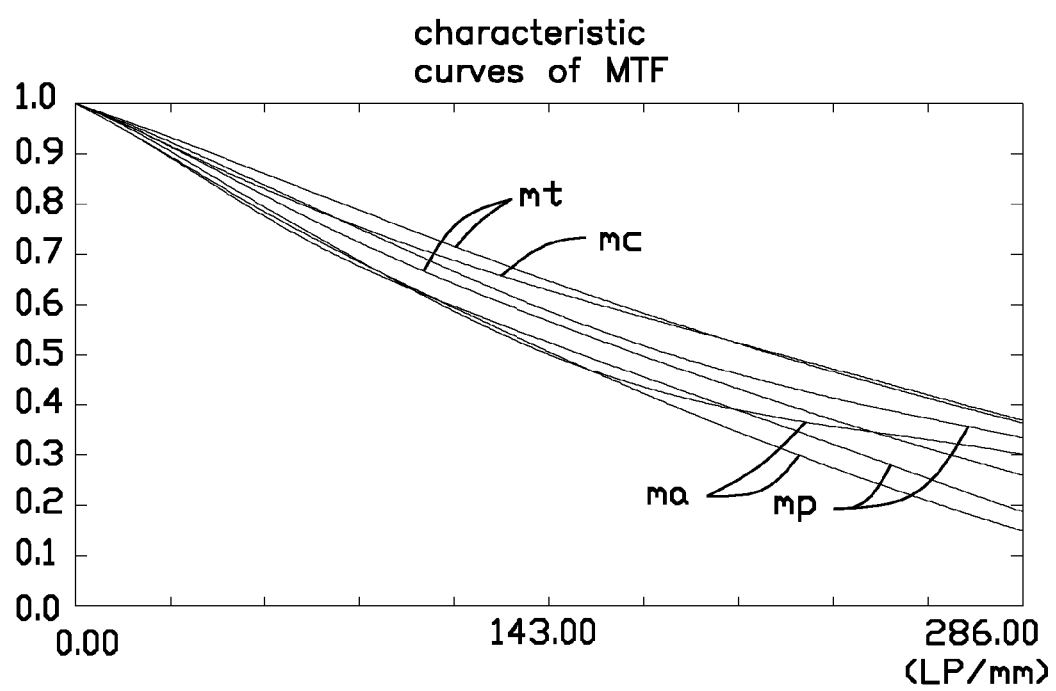
Figure 11:
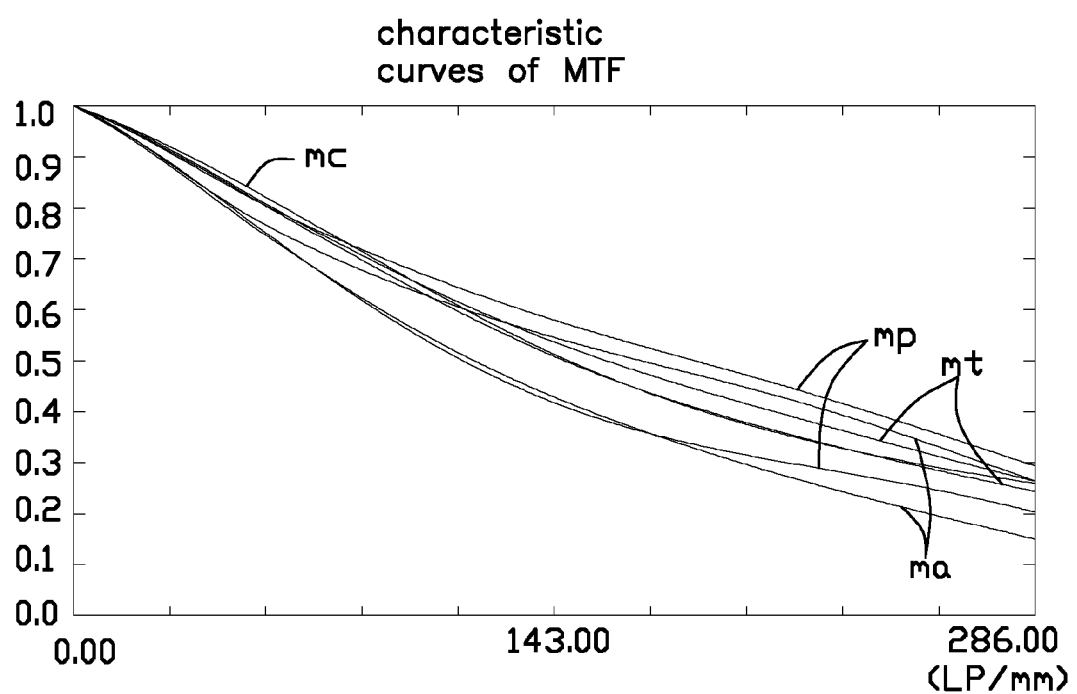

Furthermore, as shown in FIGS. 10-11, for half of the Nyquist frequency (about 1431 p/mm), when the image lens module 100 is at infinite focus setting, the MTF of the central field is greater than 62% (see curve mc), the MTF of the 1.0 field is greater than 49% (see curve ma), the MTF between the central field and the 1.0 field is in a range of: 49%~62%, such as the MTF of the 0.6 field (see curve mt), and the MTF of the 0.8 field (see curve mp). When the image lens module 100 is at close-up focus setting, the MTF of the central field is greater than 51% (see curve mc), the MTF of the 1.0 field is greater than 41% (see curve ma), the MTF between the central field and the 1.0 field is in a range of: 41%~51%, such as the MTF of the 0.6 field (see curve mt), and the MTF of the 0.8 field (see curve mp). Therefore, the image lens module 100 has a high resolution.

Figure 12:
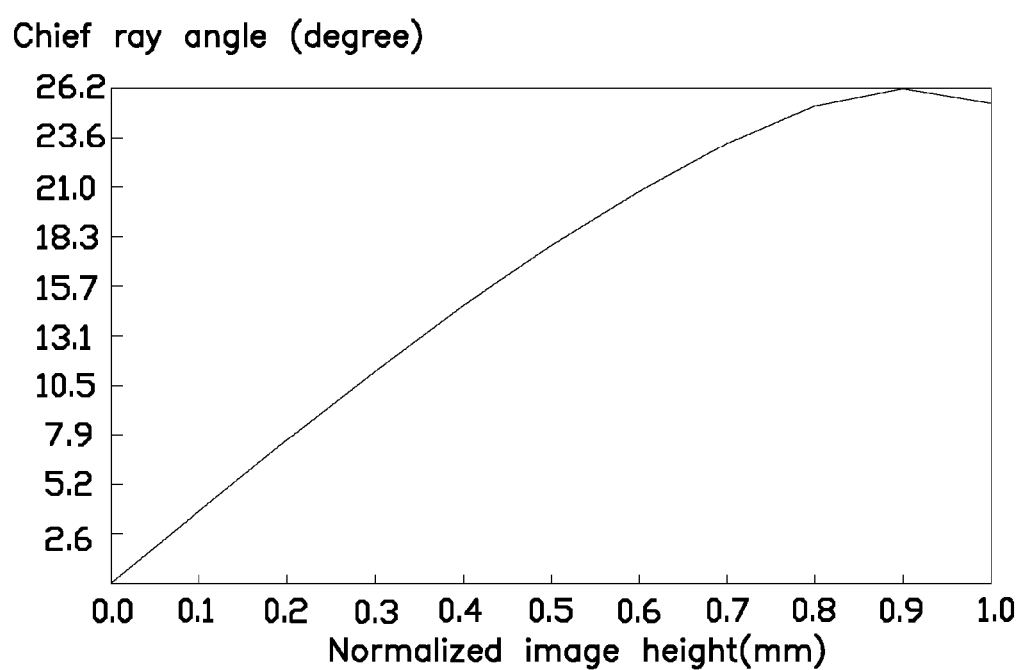
Figure 13:
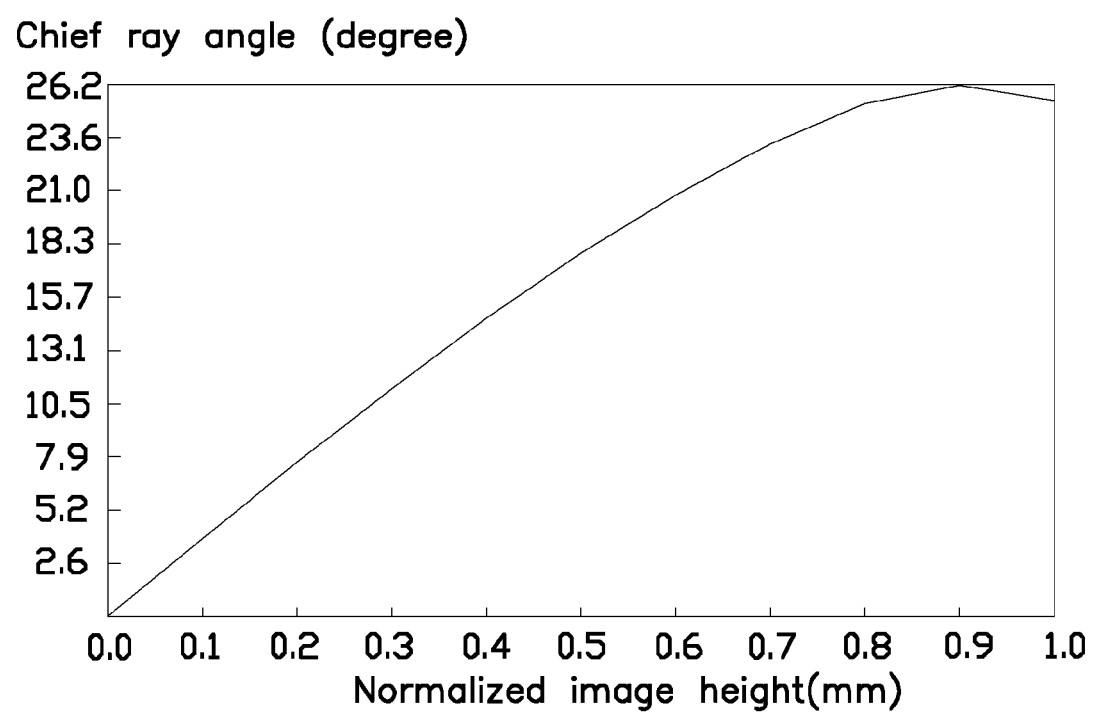

Furthermore, as shown in FIGS. 12-13, when the horizontal axis is in the range of the normalized image height, the chief ray angle (CRA) of the vertical axis of the image lens module 100 of the first exemplary embodiment is less than 26.2°. Therefore, the chief ray angle of the image lens module 100 in the first exemplary embodiment is smaller.

The image lens module 100 of a second exemplary embodiment satisfies the tables 4-6.

TABLE 4

| Surface | R (mm) | D (mm) | Nd | Vd |
|---|---|---|---|---|
| Aperture 101 | Infinity | 0.00 | — | — |
| First object-side surface S11 | 1.79 | 0.99 | 1.54 | 56.1 |
| First image-side surface S12 | −1.29 | 0.34 | — | — |
| Second object-side surface S21 | −0.50 | 0.47 | 1.64 | 23.9 |
| Second image-side surface S22 | −1.01 | 0.05 | — | — |
| Third object-side surface S31 | 1.90 | 0.93 | 1.53 | 56.0 |
| Third image-side surface S32 | 1.92 | 0.49 | — | — |
| Filter 40 | Infinity | 0.55 | 1.52 | 58.6 |
| Air | Infinity | 0.08 | — | — |
| Image plane 51 | — | — | — | — |

TABLE 5

| Surface | Aspherical coefficient |
|---|---|
| First object-side surface S11 | K = −27.42; A4 = 0.3870; A6 = −0.8941; A8 = −0.0596; A10 = −1.9583; A12 = 19.6488; A14 = −32.9004; A16 = −7.7335 |
| First image-side surface S12 | K = −4.93; A4 = −0.3865; A6 = −0.0313; A8 = −0.1279; A10 = 1.7497; A12 = −3.7417; A14 = 2.6342; A16 = −0.0770 |
| Second object-side surface S21 | K = −2.39; A4 = −0.5534; A6 = 1.6176; A8 = −1.4375; A10 = −1.7593; A12 = 6.6383; A14 = −4.9527; A16 = 0.1435 |
| Second image-side surface S22 | K = −4.27; A4 = −0.4175; A6 = 1.4608; A8 = −1.4505; A10 = 0.6656; A12 = −0.5086; A14 = 0.5498; A16 = −4.6E−03 |
| Third object-side surface S31 | K = −19.05; A4 = −0.4234; A6 = 0.6047; A8 = −0.4830; A10 = −0.1970; A12 = 0.5468; A14 = −0.3346; A16 = −1.7E−05 |
| Third image-side surface S32 | K = −0.16; A4 = −0.3357; A6 = 0.1995; A8 = −0.0676; A10 = −0.0120; A12 = 0.0132; A14 = −2.7E−03; A16 = 0.0000 |

TABLE 6

| F(mm) | F/NO | 2ω | FB(mm) | TTL(mm) | D1(mm) | D2(mm) |
|---|---|---|---|---|---|---|
| 2.73 | 2.81 | 65.05° | 1.04 | 3.89 | 0.843 | 0.201 |

In the second exemplary embodiment, F1=1.54 mm, F2=−2.41 mm, F3=19.97 mm, FB/TTL=0.26, G1R1/F1=1.16, D1/D2=4.19, G2R2/F2=0.42, G2R1/F2=0.21, G3R2/F3=0.096, G3R1/F3=0.095, Vd1=56.1, Vd2=23.9, Vd3=56.0

Figure 14:
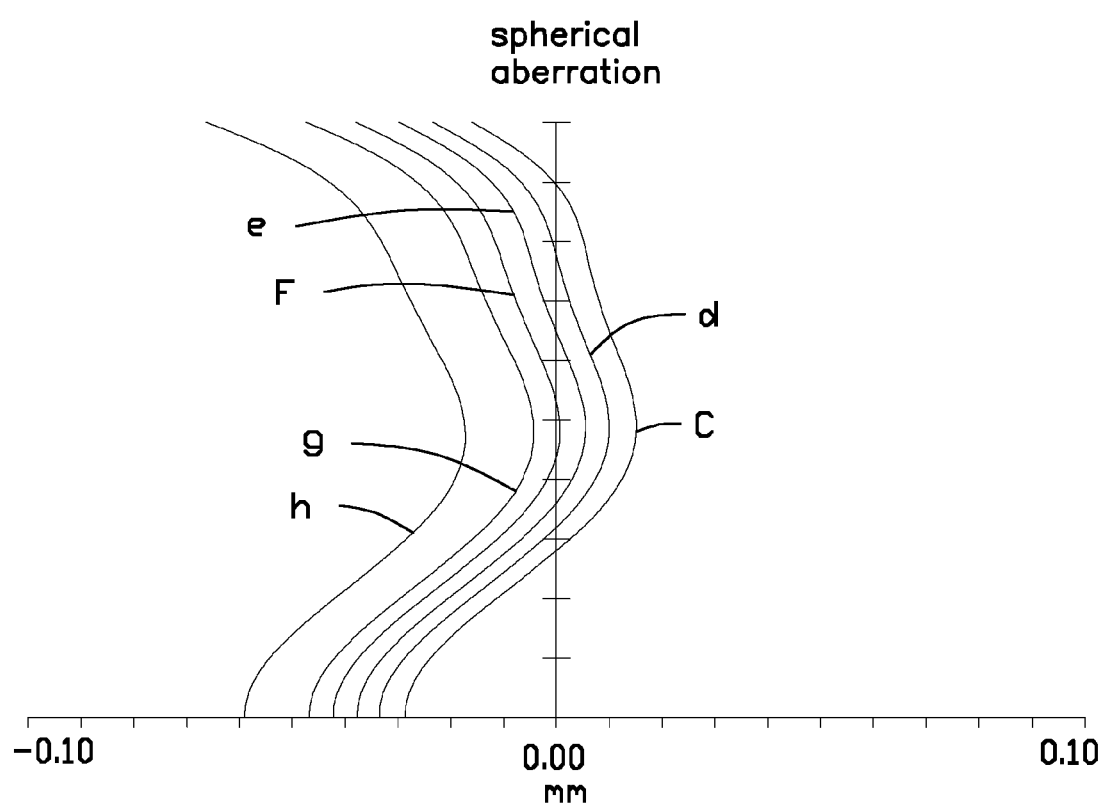
FIGS. 14, 16, 18, 20, 22, and 24 respectively show spherical aberration, field curvature, distortion, chromatic aberration, characteristic curves of modulation transfer function (MTF), and chief ray angle occurring in the image lens module, at infinite focus setting, according to a second exemplary embodiment.
Figure 15:
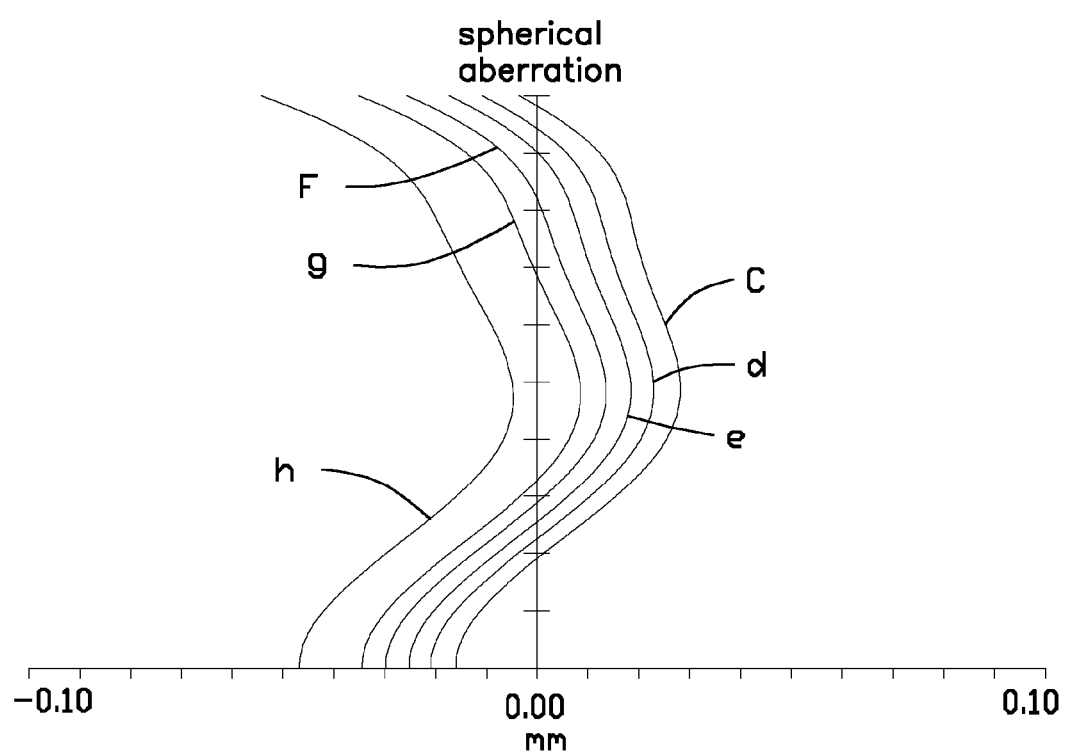
FIGS. 15, 17, 19, 21, 23, and 25 respectively show spherical aberration, field curvature, distortion, chromatic aberration, characteristic curves of modulation transfer function (MTF), and chief ray angle occurring in the image lens module, at close-up focus setting, according to the second exemplary embodiment.

Referring to FIGS. 14-15, the curves h, g, F, e, d and C are respective spherical aberration characteristic curves of h light (wavelength: 404.7 nm), g light (wavelength: 435.8 nm), F light (wavelength: 486.1 nm), e light (wavelength: 546.1 nm), d light (wavelength: 587.6 nm), C light (wavelength: 656.3 nm) occurring in the second embodiment. Obviously, spherical aberration of visible light (400-700 nm) occurring at both extremes of focus of the image lens module 100 of the second exemplary embodiment is in a range of: −0.09 mm~0.09 mm.

Figure 16:
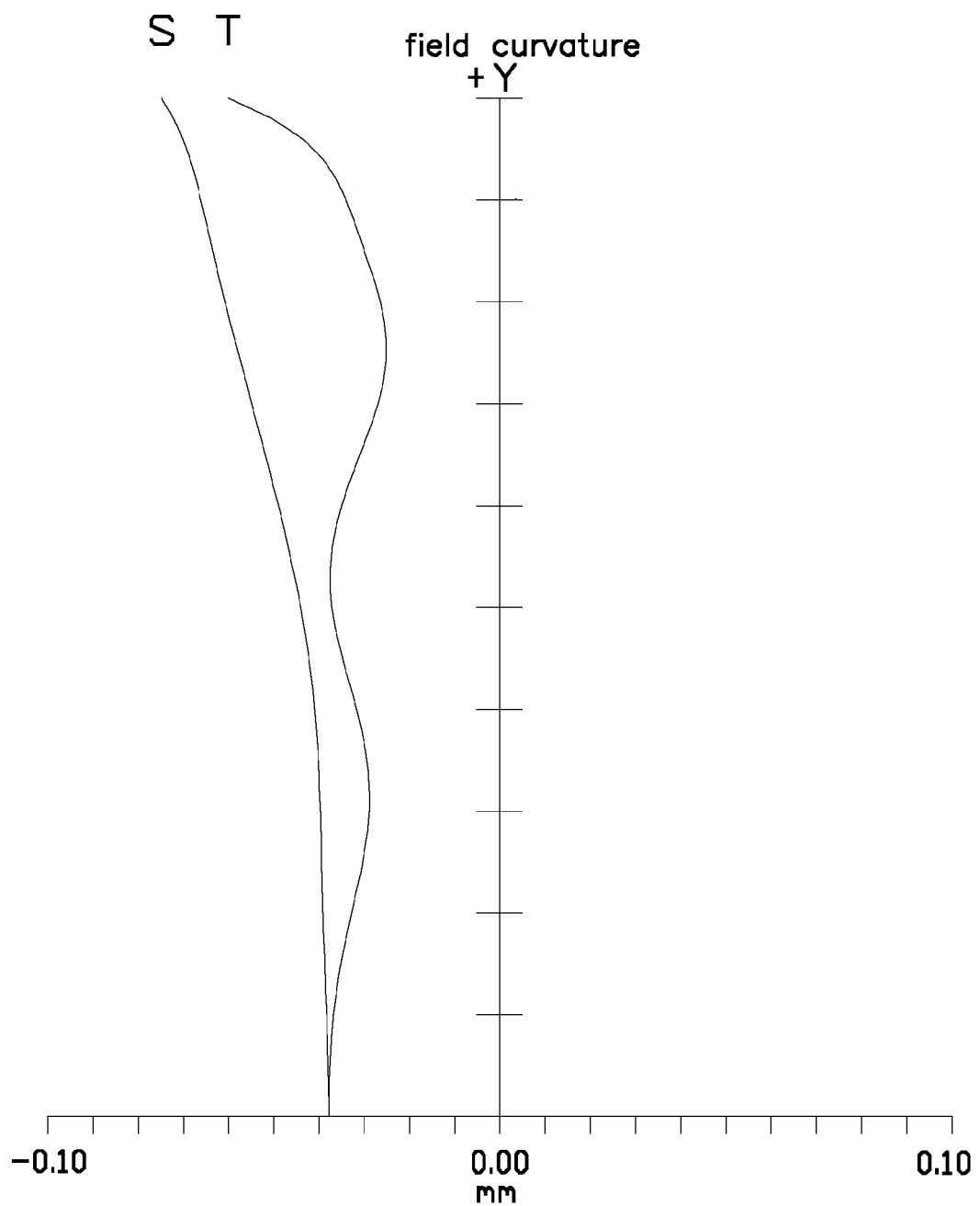
Figure 17:
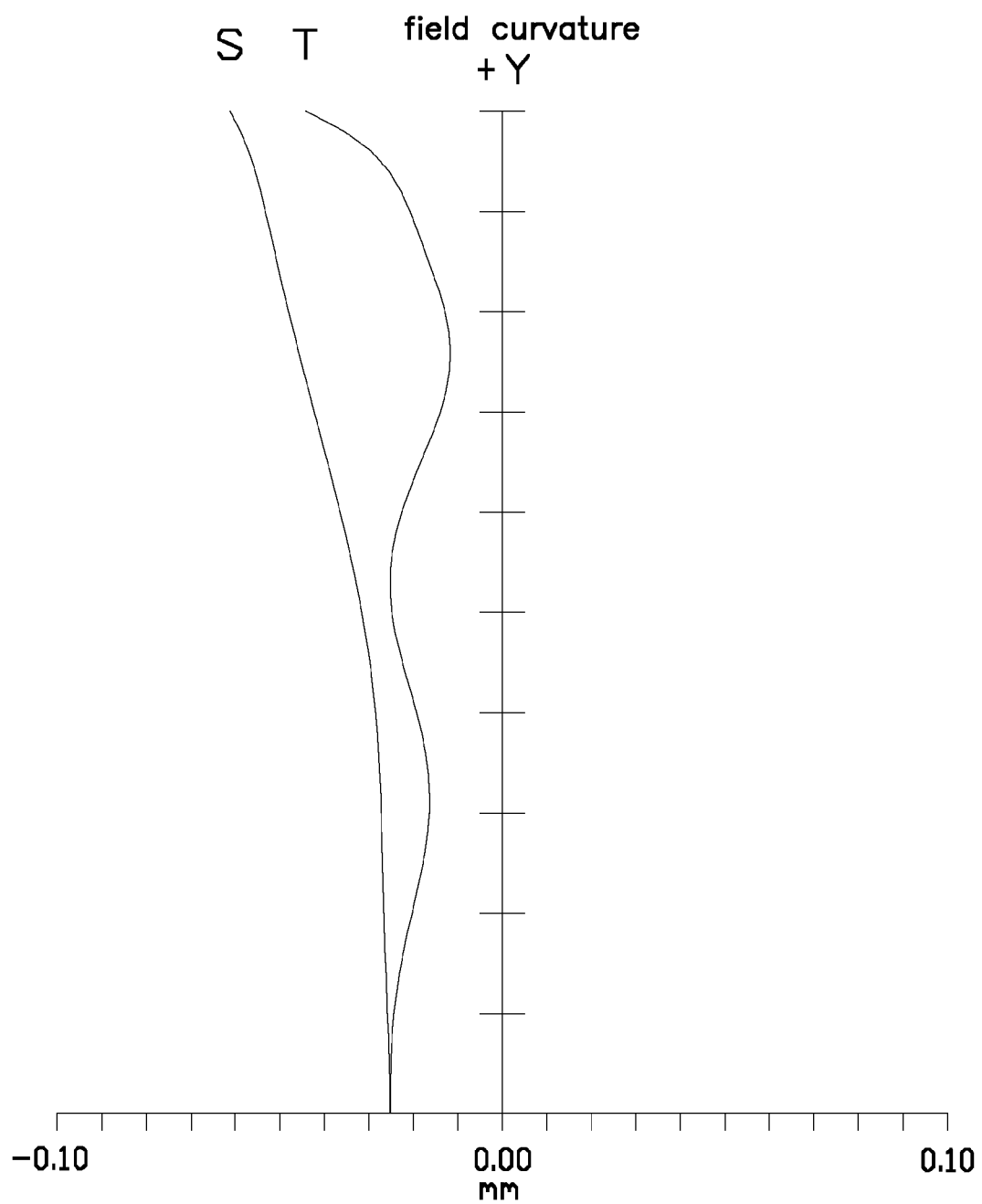

Referring to FIGS. 16-17, the curves T and S are the tangential field curvature curve and the sagittal field curvature curve, respectively. Clearly, field curvature occurring at both extremes of focus of the image lens module 100 of the second exemplary embodiment is limited to a range of: -0.1 mm~0 mm.

Figure 18:
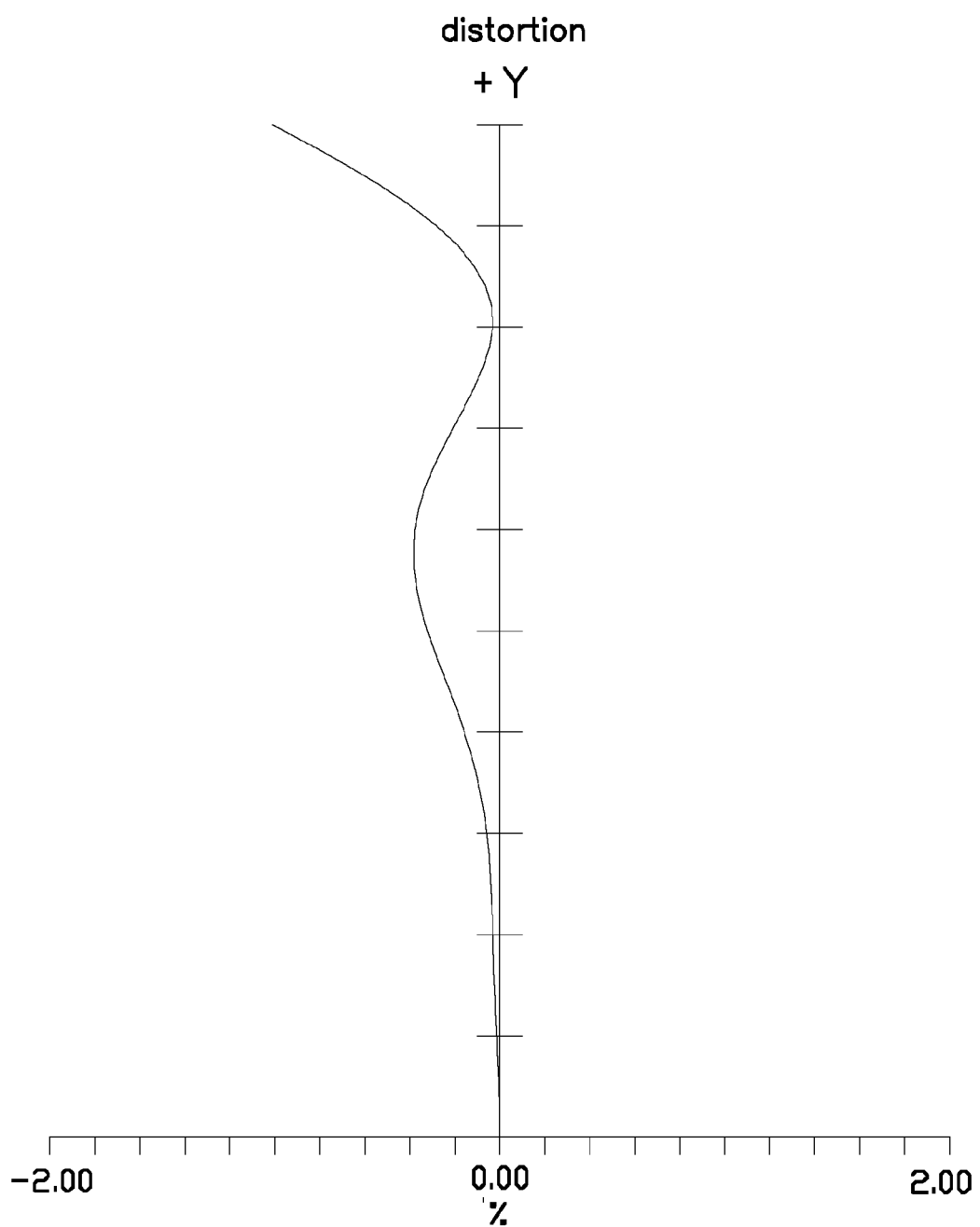
Figure 19:
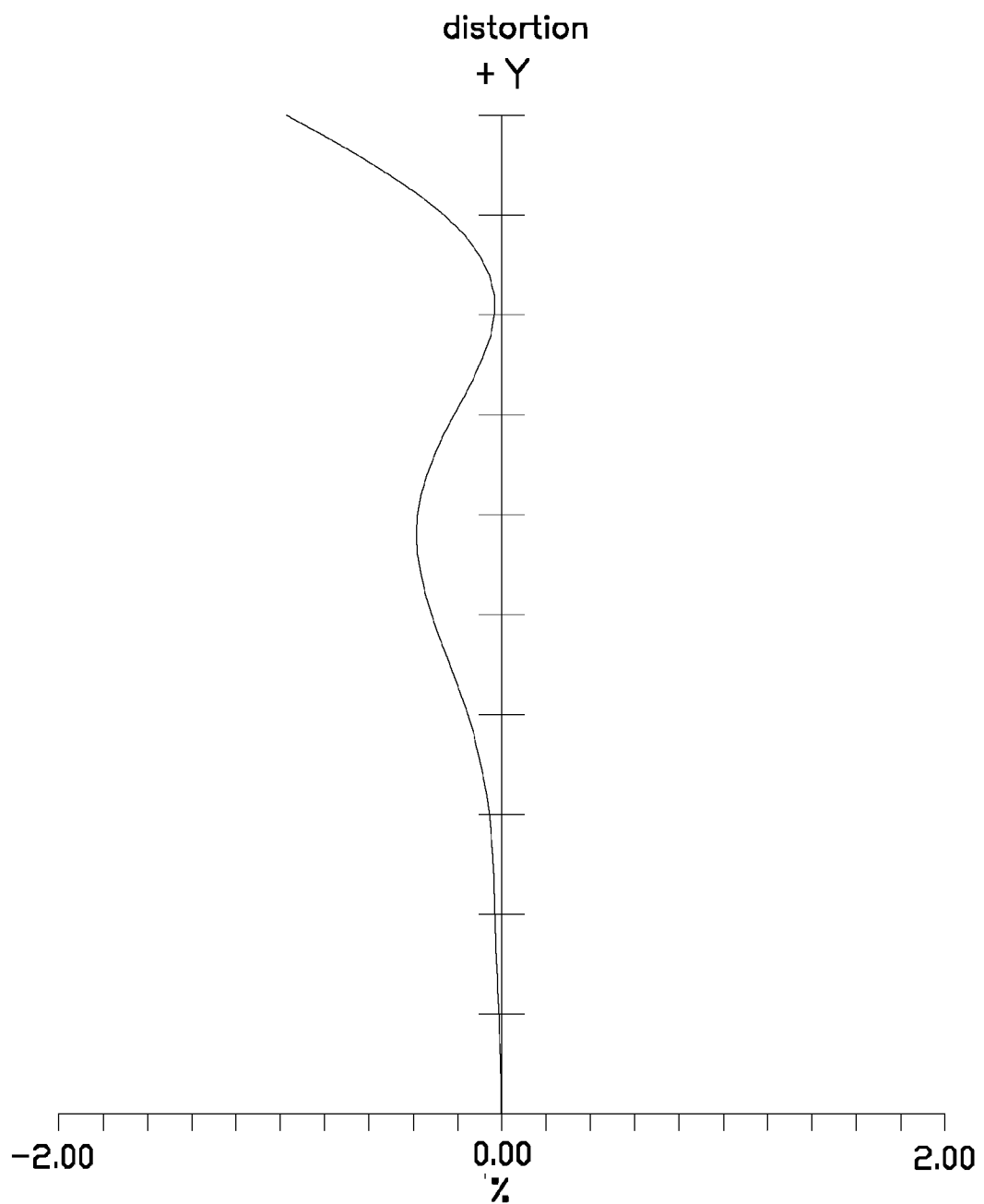

Referring to FIGS. 18-19, distortion occurring at both extremes of focus of the image lens module 100 of the second exemplary embodiment is limited to a range of: −2%~0.

Figure 20:
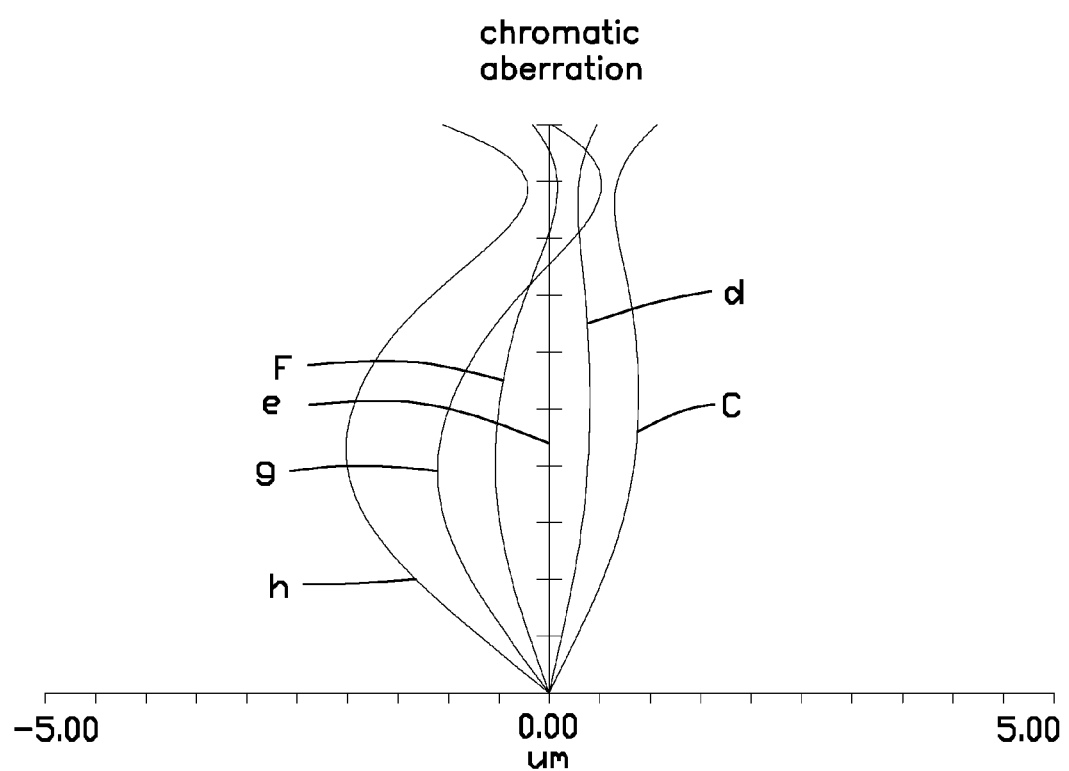
Figure 21:
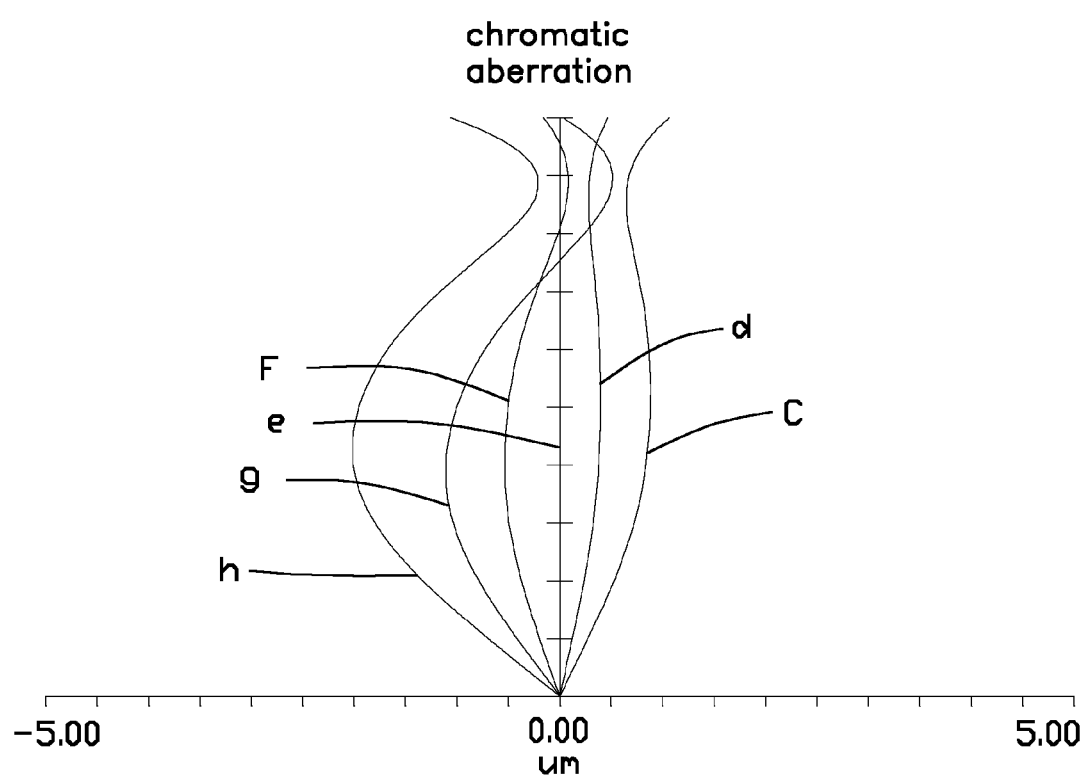

Referring to FIGS. 20-21, the curves h, g, F, e, d and C are respective chromatic aberration curves of h light (wavelength: 404.7 nm), g light (wavelength: 435.8 nm), F light (wavelength: 486.1 nm), e light (wavelength: 546.1 nm), d light (wavelength: 587.6 nm), C light (wavelength: 656.3 nm) occurring in the second exemplary embodiment. Obviously, chromatic aberration curves of visible light (400-700 nm) occurring at both extremes of focus of the image lens module 100 of the second exemplary embodiment is less than two times of side length of the pixel size. In this second exemplary embodiment, the side length of the pixel size is 1.75 μm.

Figure 22:
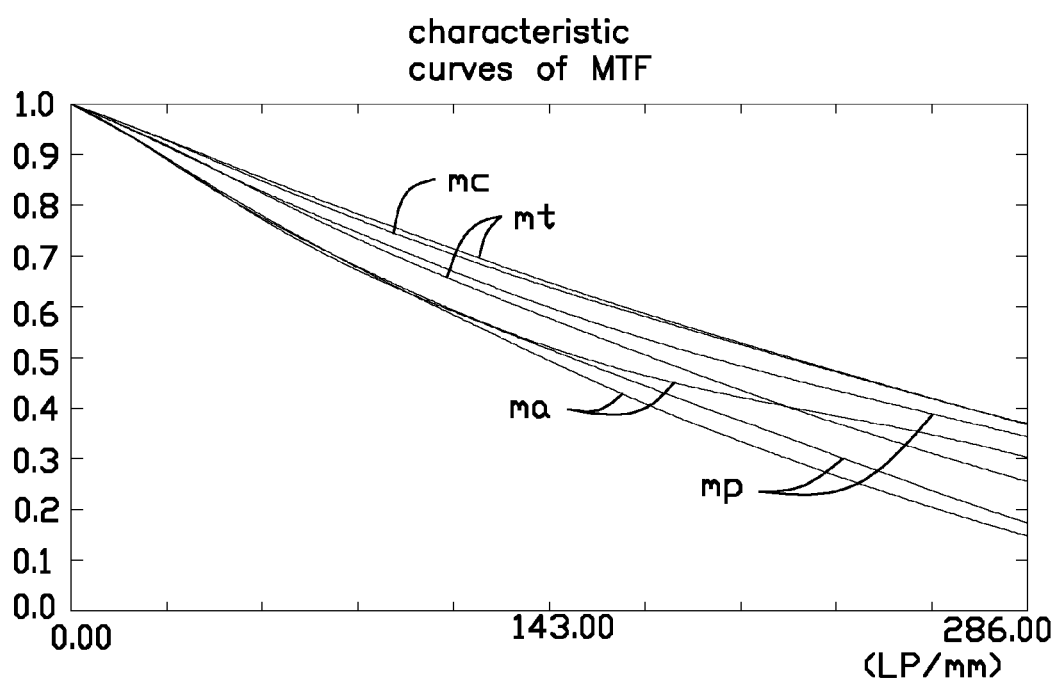
Figure 23:
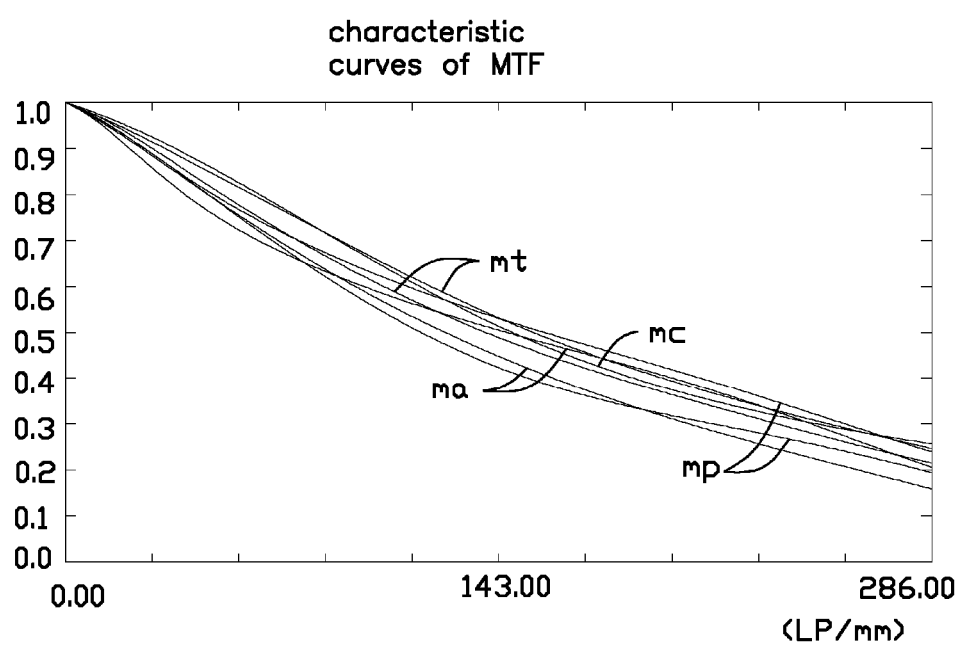

Furthermore, as shown in FIGS. 22-23, for half of the Nyquist frequency (about 1431 p/mm), when the image lens module 100 is at infinite focus setting, the MTF of the central field is greater than 62% (see curve mc), the MTF of the 1.0 field is greater than 49% (see curve ma), the MTF between the central field and the 1.0 field is in a range of: 49%~62%, such as the MTF of the 0.6 field (see curve mt), and the MTF of the 0.8 field (see curve mp). When the image lens 100 is at close-up focus setting, the MTF of the central field is greater than 51% (see curve mc), the MTF of the 1.0 field is greater than 41% (see curve ma), the MTF between the central field and the 1.0 field is in a range of: 41%~51%, such as the MTF of the 0.6 field (see curve mt), and the MTF of the 0.8 field (see curve mp). Therefore, the image lens module 100 has a high resolution.

Figure 24:
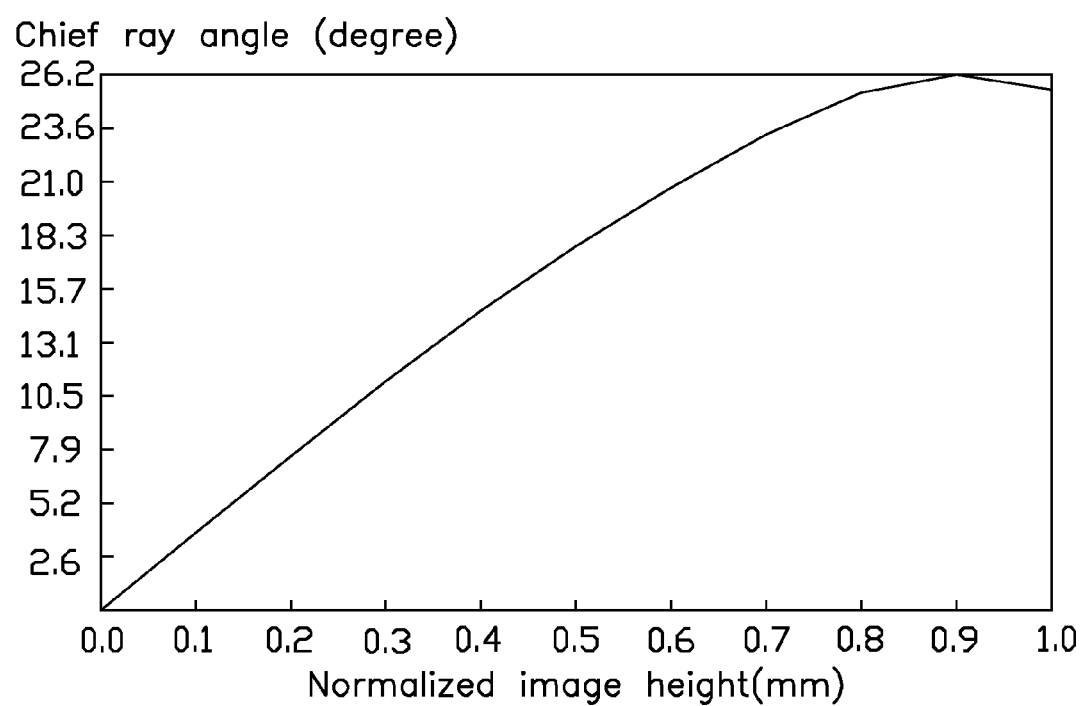
Figure 25:
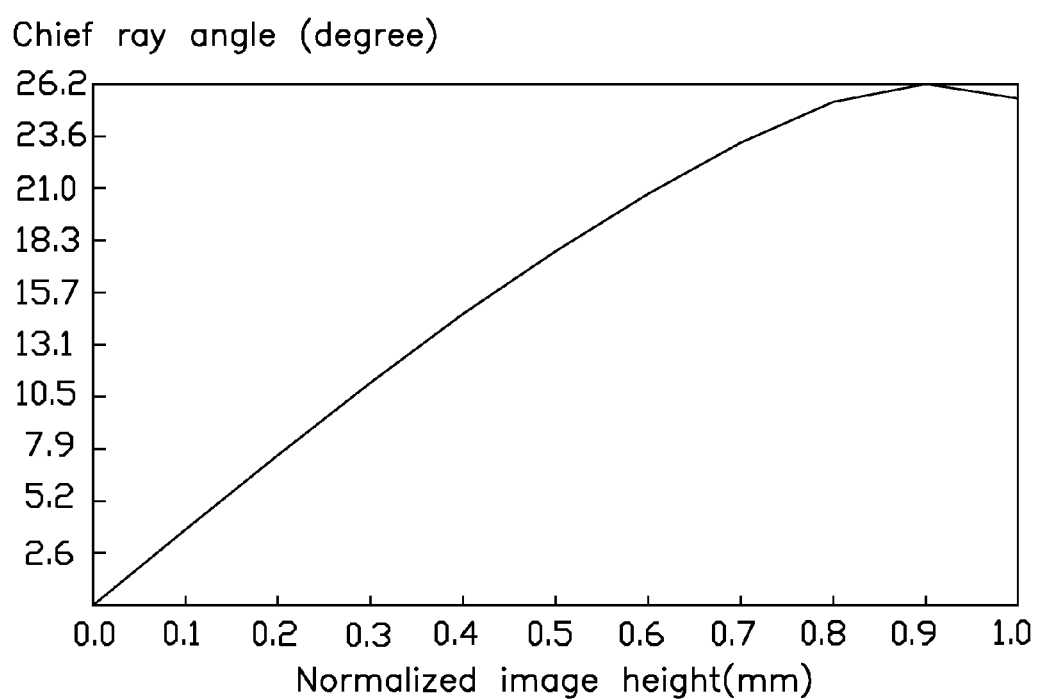

Furthermore, as shown in FIGS. 24-25, when the horizontal axis is in the range of the normalized image height, the chief ray angle (CRA) of the vertical axis of the image lens module 100 of the second exemplary embodiment is less than 26.2°. Therefore, the chief ray angle of the image lens module 100 in the second exemplary embodiment is smaller.

The image lens module 100 satisfies the above formulas, and thus has both a long FBD and is a wide-angle lens module, while providing good image quality at infinite focus setting and at close-up focus setting. Furthermore, the CRA of the image lens module 100 is smaller, and thus more incident rays can enter the image lens module 100 to further enhance image quality.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image lens module, in an order from an object side to an image side thereof, comprising:
    a first lens with positive refractive power, the first lens comprising a first object-side surface and a first image-side surface;
    a second lens with negative refractive power, the second lens comprising a second object-side surface and a second image-side surface;
    a third lens with positive refractive power, the third lens comprising a third object-side surface and a third image-side surface; and
    an image plane;
    wherein the image lens module satisfies the formulas:

FB/TTL>0.16;     (1)

G1R1/F1>1.04; and     (2)

D1/D2<4.47;     (3)

wherein FB is a distance between an apex of the third image-side surface and the image plane in a direction parallel to an optical axis of the image lens module, TTL is a distance between the first object-side surface and the image plane along the optical axis, G1R1 is a radius of curvature of the first object-side surface, F1 is the focal length of the first lens, D1 is a distance between the end of the effective diameter of the second image-side surface and an optical axis of the second image-side surface along a direction perpendicular to the optical axis of the image lens module, D2 is a distance between the end of the effective diameter of the second image-side surface and an apex of the second image-side surface along the optical axis of the image lens module.

2. The image lens module of claim 1, wherein the image lens module further satisfies the formulas: $0.58>G2R2/F2>G2R1/F2>0.10$ and $0.23>G3R2/F3>G3R1/F3>0$, wherein G2R1 is a radius of curvature of the second object-side surface, G2R2 is a radius of curvature of the second image-side surface, G3R1 is a radius of curvature of the third object-side surface, G3R2 is a radius of curvature of the third image-side surface, F2 is the focal length of the second lens, F3 is the focal length of the third lens.

3. The image lens module of claim 1, wherein the image lens module further satisfies the formulas: $Vd1>53$, $Vd2<33$, and $Vd3>53$, wherein Vd1 is an Abbe number of the first lens, Vd2 is an Abbe number of the second lens, Vd3 is an Abbe number of the third lens.

4. The image lens module of claim 1, wherein the image lens module further comprises an aperture, and the aperture is positioned on the first object-side surface of the first lens.

5. The image lens module of claim 1, wherein the image lens module further comprises a filter, and the filter is positioned between the third lens and the image plane.

6. The image lens module of claim 1, wherein the first object-side surface, the first image-side surface, the second image-side surface, and the third object-side surface are convex surfaces, the second object-side surface and the third image-side surface are concave surfaces.

7. The image lens module of claim 1, wherein the first object-side surface, the first image-side surface, the second object-side surface, the second image-side surface, the third image-side surface, and the third object-side surface are aspherical surfaces.

* * * * *